US008568035B2

(12) United States Patent  (10) Patent No.: US 8,568,035 B2
Claude et al.  (45) Date of Patent: Oct. 29, 2013

(54) ROLLING BEARING AND CAGE FOR SUCH A BEARING

(75) Inventors: Francis Claude, Saint Cyr sur Loire (FR); Armel Louis Doyer, Savonnieres (FR); Alexandre Manceau, Saint Cyr sur Loire (FR); Jean-Marie Gerard, Joue-les-Tours (FR); Alberto Ferla, Bricherasio (IT)

(73) Assignee: Aktiebolaget SKF, Göteborg (SE)

( * ) Notice: Subject to any disclaimer, the term of this patent is extended or adjusted under 35 U.S.C. 154(b) by 469 days.

(21) Appl. No.: 12/680,506

(22) PCT Filed: Sep. 25, 2008

(86) PCT No.: PCT/EP2008/062818
§ 371 (c)(1),
(2), (4) Date: Dec. 14, 2010

(87) PCT Pub. No.: WO2009/040390
PCT Pub. Date: Apr. 2, 2009

(65) Prior Publication Data
US 2011/0103729 A1 May 5, 2011

(30) Foreign Application Priority Data

Sep. 26, 2007 (FR) ...................................... 07 57871

(51) Int. Cl.
*F16C 33/41* (2006.01)
(52) U.S. Cl.
USPC ........................................................ 384/531
(58) Field of Classification Search
USPC .................... 384/523, 526, 527, 531
See application file for complete search history.

(56) References Cited

U.S. PATENT DOCUMENTS

| 1,915,288 | A |   | 6/1933 | Bott |
| 4,963,040 | A | * | 10/1990 | Takebayashi et al. ........ 384/492 |
| 5,015,105 | A | * | 5/1991 | Ueno ............................. 384/531 |
| 8,157,449 | B2 | * | 4/2012 | Doyer et al. .................. 384/531 |
| 2002/0114550 | A1 | * | 8/2002 | Daikuhara .................... 384/470 |

FOREIGN PATENT DOCUMENTS

| EP | 0849481 A | 6/1998 |
| GB | 17603 A | 10/1909 |
| GB | 210079 A | 12/1924 |
| JP | 0304872 A | 3/1989 |
| JP | 2000161365 A | 6/2000 |
| JP | 2002147463 A | 5/2002 |

OTHER PUBLICATIONS

SKF General Catalogue 5000 E, Jun. 2003, pp. 140-145 SKF, 2003/Germany.

* cited by examiner

*Primary Examiner* — Thomas R Hannon
(74) *Attorney, Agent, or Firm* — Bryan Peckjian; SKF USA Patent Group

(57) ABSTRACT

Retaining cage for balls of a rolling bearing, comprising an annular shoulder (16) extended axially by projecting portions (18) defining between them sockets (15) for the balls, emerging radially on either side of the cage. The cage was made from a metal and the surface of each socket (15) is designed to cooperate with one of the balls and is defined by an imaginary cylinder with an axis oriented radially and cut by the plane axially delimiting the cage on the side opposite the shoulder (16) so as to form an axial opening of the socket, the width of this opening being smaller than the diameter of the said imaginary cylinder.

25 Claims, 4 Drawing Sheets

ROLLING BEARING AND CAGE FOR SUCH A BEARING

BACKGROUND OF THE INVENTION

The invention relates to rolling bearings, especially ball bearings of the deep-groove type, used in applications for high speeds of rotation and high temperatures. The invention relates in particular to the ball retaining cage which provides the correct circumferential spacing between the balls.

Ball retaining cages for rolling bearings made of synthetic material are known, including sockets for housing the balls. The sockets are separated by claws arranged in pairs, opposite a shoulder. Such retaining cages are entirely satisfactory in many applications. However, in applications where extreme speed and acceleration conditions, coupled with high operating temperatures, are encountered, this kind of cage leads to various problems. This may be the case, for example, for bearings used in multi-plate clutches, for Formula 1-type racing cars. With the clutch engaged, the two races of the bearing turn at the same speed and in the same direction at speeds of the order of 19,000 rpm. There is then no relative movement between the races, the rolling elements and the cage. However, during gear-change sequences (clutch disengaging/engaging), in the space of approximately 40 milliseconds, the inner race of the bearing slows in relation to the outer race with a possible speed difference of 9000 rpm, then accelerates again to regain a speed of rotation equal to that of the outer race, all this at temperatures of the order of 200° C. to 250° C.

At such speeds and such temperatures, a ball retaining cage made of synthetic material tends to take on a conical shape due to the action of centrifugal force. It is said to "mushroom." In fact, due to centrifugal force, the cage is subjected to stresses which tend to deform it, mainly in the radial direction, and give it a conical shape by increasing its diameter on the less rigid side, that is to say the open side of the ball housing sockets. This deformation phenomenon is made even worse because these cages are made of synthetic material which has a tendency to soften at high temperature.

Of course, such deformations can have consequences which are detrimental to the correct operation of the rolling bearing. In particular, in cages of known type, they lead to a risk of contact between the cage and the bore of the outer race of the bearing.

The European patent application EP-A-0,304,872 describes a ball bearing cage designed to withstand high temperatures, the balls moving in a deep-groove outer race. The cage described is made of carbon. It is in the form of a solid ring comprising sockets which emerge in areas cut out of one of the edges of the cage. The width of the cut-out areas is slightly smaller than the diameter of the balls, so that they are correctly retained inside the sockets. Such a cage is expensive and is not suitable for high speeds and high accelerations because of its inertia due to a solid structure. In addition, the use of carbon for the construction of such a cage makes it relatively fragile and sensitive to impacts.

SUMMARY OF THE INVENTION

The object of the present invention is to solve these problems, and provide a cage and a rolling bearing fitted with such a cage which can operate as efficiently as possible at high speeds and high accelerations, at high temperature.

In particular, the cage of the present invention is designed so as to reduce the distortions or deformations due to centrifugal force and so that there is no danger of these deformations having a negative effect on the correct operation of the rolling bearing fitted with such a cage.

Finally, one aim of the present invention is also to provide a ball bearing fitted with a cage and a cage for such a bearing, which are easy to manufacture and less expensive.

In one embodiment, a rolling bearing comprises an outer race and an inner race between which is mounted at least one row of balls held by a cage of annular general shape. The cage has an annular shoulder extended axially by projecting portions defining between them sockets for the balls, emerging radially on either side of the cage. The cage is made from a metal. The surface of each socket cooperating with one of the balls is defined by an imaginary cylinder with an axis oriented radially and cut by the plane axially delimiting the cage on the side opposite the shoulder, so as to form an axial opening of the socket, the width of this opening being smaller than the diameter of the balls. The diameter of the aforementioned imaginary cylinder is slightly larger than that of the balls, so that the area of contact of the balls with the sockets is generally reduced to a point.

Preferably, the radial thickness of the shoulder of the cage is larger than the radial thickness of the free ends of the said projecting portions.

Thus, the critical area opposite the shoulder of the cage, including the projecting portions and the sockets, is lightened but retains an adequate stiffness. In addition, the material of the cage is mainly concentrated towards the centre of rotation of the cage. The radial deformations of the critical area of the cage at high speeds of rotation are therefore considerably reduced. In addition, the risk of contact with the bore of the outer race of the bearing is removed.

The use of a metal cage makes it possible moreover to be free of the temperature resistance problems that may be encountered with cages made from synthetic materials.

Preferably, the outer diameter of the projecting portions, when the bearing is stationary, is smaller than the outer diameter of the shoulder and larger than the original diameter of the bearing corresponding to the diameter of the circle described by the centres of the balls when the bearing is operating. When the bearing is turning at high speed, the areas of contact between the balls and the sockets of the cage tends to move closer to the centres of the balls during radial deformations of the projecting portions of the cage due to centrifugal force. The result of this is a better performance of the balls at high speed.

Preferably, the axial length of the said projecting portions is smaller than the diameter of the balls.

The width of the axial opening of the sockets can be between 92% and 97% of the diameter of the balls. The balls are thus housed in open cylindrical sockets, the diameter of the cylinder defining the internal walls of the sockets being slightly larger than the diameter of the balls. The balls, once installed in the sockets, protrude axially from the openings of the sockets.

The balls are retained in the sockets and can be inserted in them by elastic deformation of the projecting portions of the cage.

To facilitate this elastic deformation, the said projecting portions can advantageously have axial slits or notches between the sockets. Tabs are thus formed on each side of the axial openings of the sockets. These tabs can bend very slightly, without exceeding the elastic limit of the material, in the circumferential direction, when the cage is clicked into place axially over the balls, then return to their initial position to retain the balls axially in the cage.

The slits or notches can for example extend over an axial length of between 20% and 60% of the axial length of the said projecting portions, preferably approximately 50%.

The cage can be placed around the inner race of the bearing with a radial clearance between the cage and the said race advantageously of between 0.1 and 0.4 mm, preferably between 0.1 and 0.2 mm.

According to another aspect of the invention, a retaining cage for balls of a rolling bearing comprises an annular shoulder extended axially by projecting portions defining between them sockets for the balls, emerging radially on either side of the cage. The cage is made from a metal. The surface of each socket designed to cooperate with one of the balls is defined by an imaginary cylinder with an axis oriented radially and cut by the plane axially delimiting the cage on the side opposite the shoulder so as to form an axial opening of the socket, the width of this opening being smaller than the diameter of the said imaginary cylinder.

Preferably, the radial thickness of the shoulder is larger than the radial thickness of the free ends of the said projecting portions.

The axial length of the said projecting portions is preferably smaller than the diameter of the said imaginary cylinder.

The said projecting portions have advantageously axial slits or notches between the sockets facilitating the insertion of the balls in the sockets by elastic deformation of the projecting portions.

The shoulder and the projecting portions are connected preferably by a rounded part.

Whatever the case, the material selected for the cage can be a copper alloy such as bronze, especially CuSn8P, or brass, especially CuZn40Mn1Pb.

Thus, a low coefficient of friction is obtained on the steel of the balls and on the cylindrical bearing surface of the inner race of the bearing around which the cage is placed.

A steel can also be used, especially of the AMS 6415 type, for the construction of the cage. The coefficient of friction between the balls and the inner race of the bearing can advantageously be reduced by providing a metallic antifriction coating on the surfaces of the cage, for example a coating containing silver.

Such a cage can be manufactured from an annular rough-forged piece or obtained by cutting sections from a tube. Then radial holes are drilled right through to form the inner surfaces of the sockets. The various diameters and faces can be machined by turning. The slits or notches between the sockets can be obtained by milling.

BRIEF DESCRIPTION OF THE SEVERAL VIEWS OF THE DRAWINGS

The invention will be better understood from the study of a detailed embodiment described as a non-limiting example and illustrated by the accompanying drawings, in which.

DETAILED DESCRIPTION OF THE INVENTION

Figure 1:
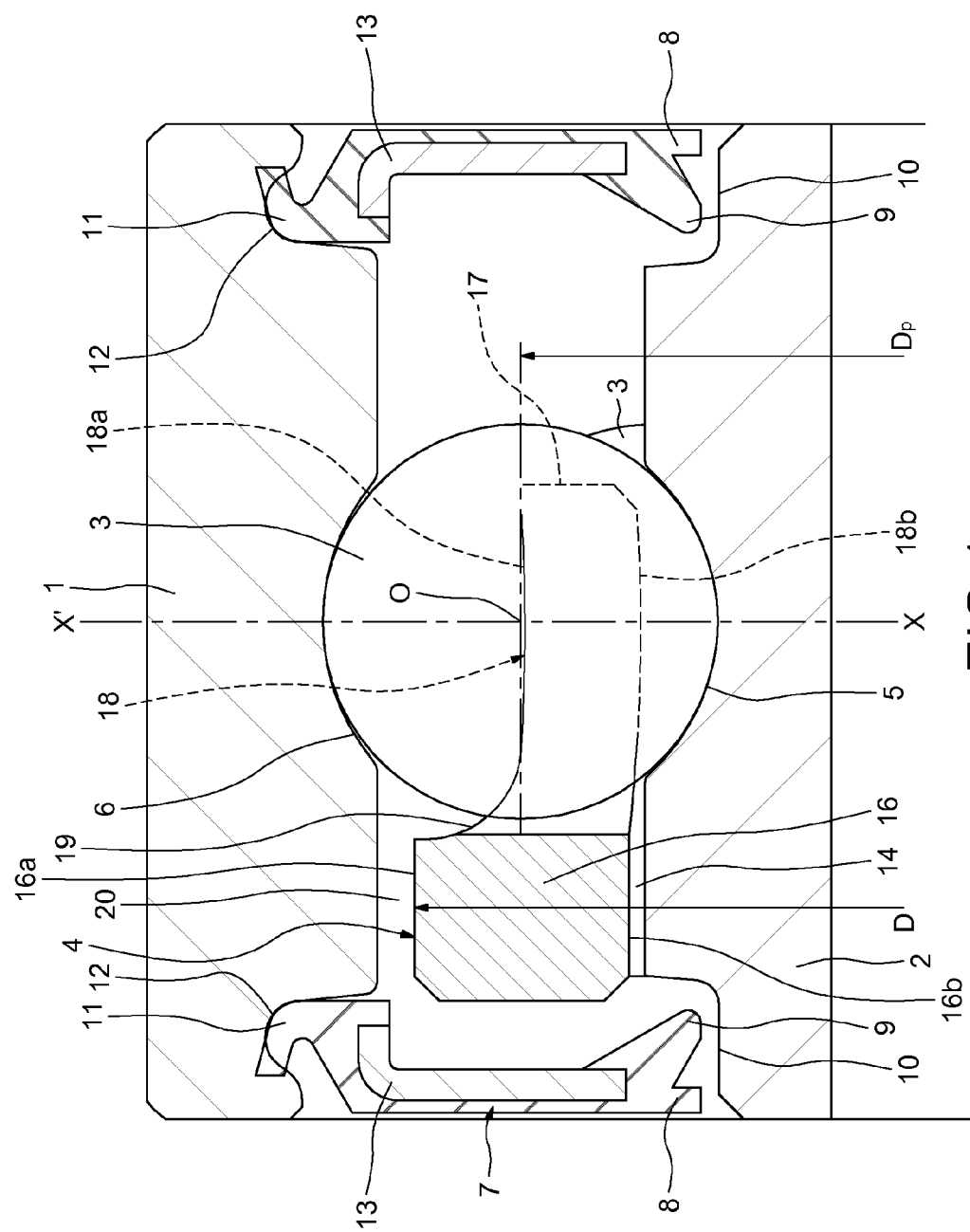
FIG. 1 is a cross-section view of a rolling bearing according to the invention, showing the bearing stationary or turning at low speed.

Referring firstly to FIG. 1, the rolling bearing illustrated, which is illustrated in the stationary state or turning at low speed, without deformation due to centrifugal force, comprises an outer race 1, and an inner race 2. Between the two races 1, 2, is mounted a row of balls 3 held by a cage 4 of annular general shape. The balls 3 roll on deep bearing tracks of toroidal shape made respectively in the outer surface 5 of the inner race 2, and in the bore 6 of the outer race 1. The rolling bearing is protected from external attacks by two side seals 7, which have a general annular plate shape having on the bore side two sealing lips 8 and 9 which, in operation, form a narrow passage between them and a cylindrical surface 10 which is an integral part of the inner race 2, and of which the outer diameter is smaller than the outer diameter of the inner race 2. The outer periphery of each of the seals 7, has an elastic rim 11 which can click into place in a groove 12 made in the lateral edge of the bore of the outer race 1. The seals 7, are made of flexible synthetic material moulded onto an internal stiffening plate 13.

The annular cage 4 is placed around the outer cylindrical surface of the inner race 2, with a radial clearance 14 of the order of 0.1 to 0.2 mm between the inner surfaces 16b and 18b of the shoulder 16 and the projecting portions 18 on the one hand, and the outer surface of the inner race 2.

The cage 4 is made of a metal. In addition, the cage includes, as can be seen more clearly in FIGS. 2 and 3, a series of sockets 15 equally distributed on its periphery and arranged to receive the balls 3. On the opposite side from the sockets 15, the cage 4 has an annular shoulder 16.

The sockets 15 emerge radially on either side of the cage 4. Each socket 15 is defined by an imaginary cylinder with an axis XX' oriented radially, passing through the centre O of the balls 3 and cut by the plane axially delimiting the cage 4 on the side opposite the shoulder 16. The path of this plane is shown by the free ends 17 of the projecting portions 18 which are connected by a rounded part 19 to the shoulder 16 (see FIGS. 1 and 2). The radial thickness of the shoulder 16 is larger than the radial thickness of the free ends of the projecting portions 18, as can be clearly seen in the figures.

Figure 2:
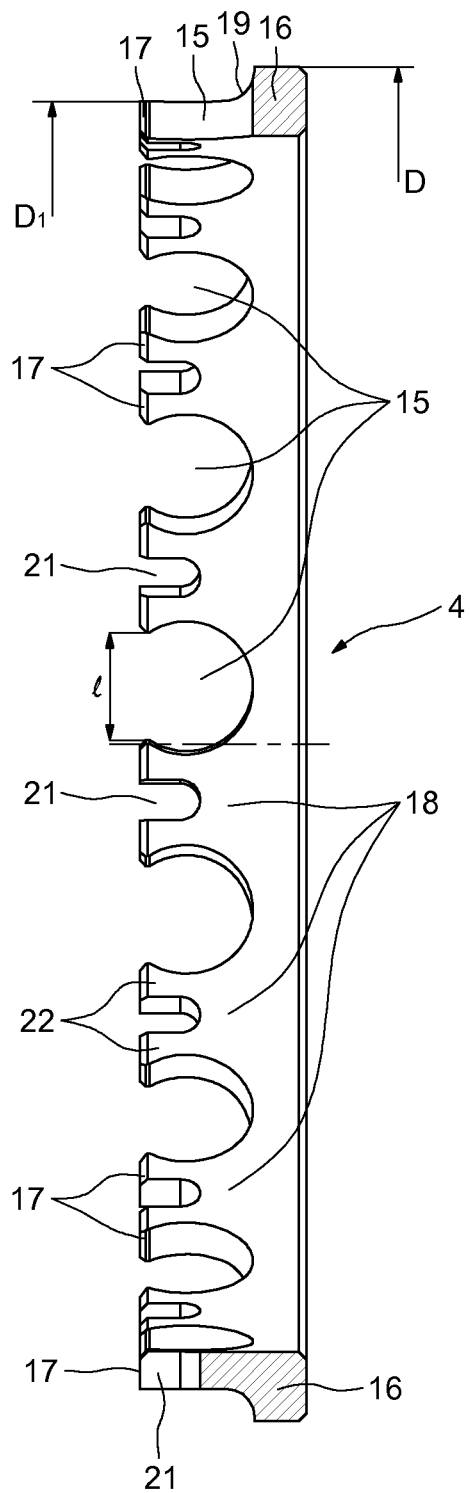
FIG. 2 shows, also in cross section, a cage used in a bearing according to the invention.
Figure 3:
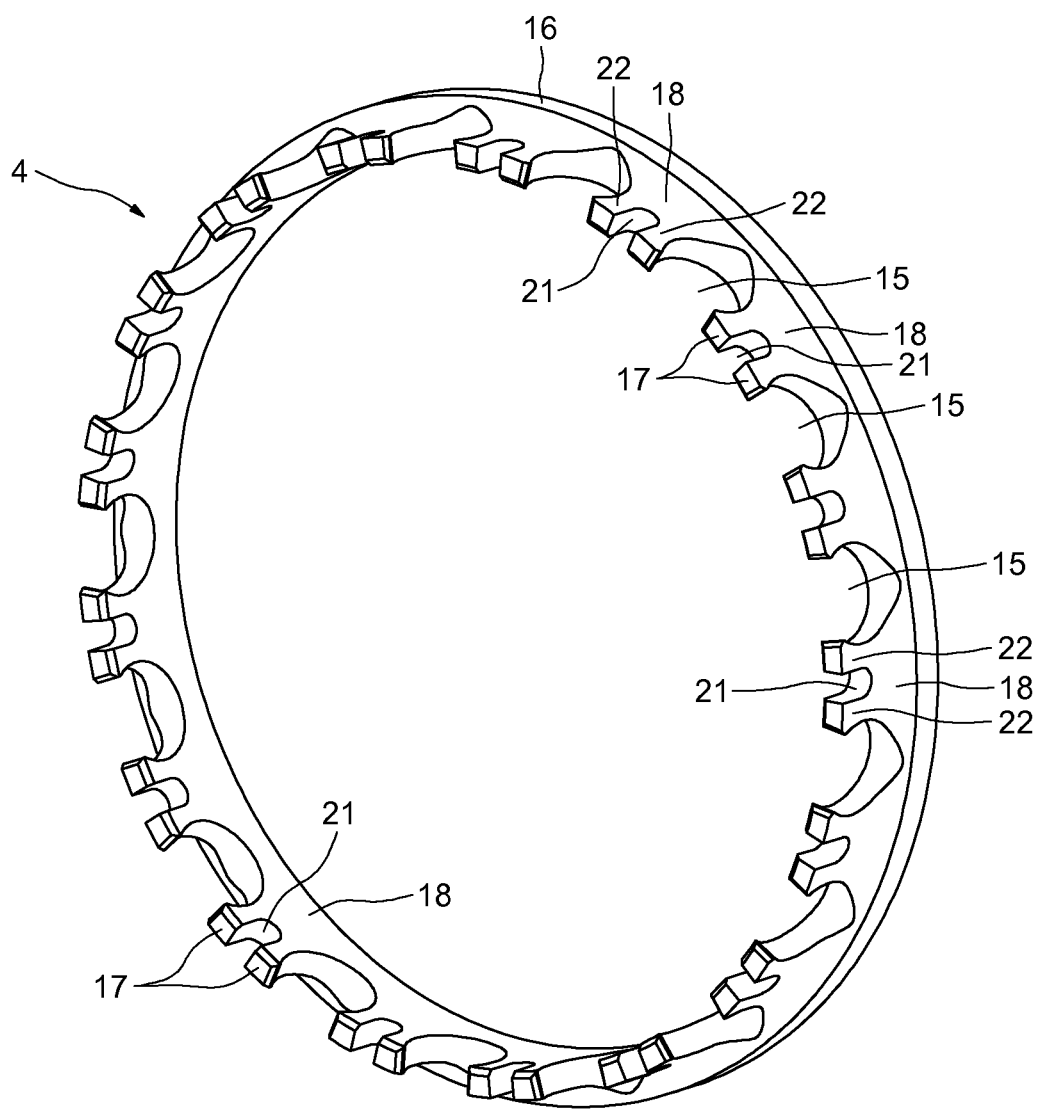
FIG. 3 illustrates the cage in FIG. 2 in perspective.

The outer diameter of the cage 4 at the point of the projecting portions 18, marked $D_1$ in FIG. 2, is between two limits. It is firstly smaller than the outer diameter, marked D in FIG. 1, of the shoulder 16. In addition, the diameter $D_1$ of the projecting portions 18 is larger than the original diameter, marked $D_p$ in FIG. 1, which corresponds to the diameter of the circle described by the centres of the balls 3. The area of contact between each socket 15 and the corresponding ball 3 comprises a joint located on an equatorial plane of the ball and close to the outer surface 18a of the projecting portion 18. As can be seen in FIG. 1, the outer diameter D of the shoulder 16 is such that a relatively large gap remains, marked 20, between the outer surface 16a of the shoulder 16 and the bore of the outer race 1. A much larger gap is maintained between the outer surface 18a of the projections 18 and the bore of the outer race 1, so that, when the projecting portions 18 deform due to centrifugal force, there can be no contact between these portions 18 and the bore of the outer race 1.

The projecting portions 18 which delimit the sockets 15 for retaining the balls 3 are disposed so that as much material as possible is concentrated towards the centre of rotation of the cage 4. The greater part of the projecting portions 18 is disposed on the inside in relation to the centre O of the balls 3. In addition, the general structure of the annular cage 4, with its shoulder 16 and its projecting portions 18, produces a particularly lightened cage while maintaining suitable stiffness.

The axial length of the projecting portions 18 is smaller than the diameter of the imaginary cylinder defining the sockets 15 and the diameter of the balls 3, as can be seen in FIG. 1, where the free outer edge 17 of a projecting portion 18 is hidden by a ball 3 illustrated in the figure. The sockets 15 defined, as previously stated, by the imaginary cylinder cut by the plane corresponding to the outer edge of the cage 4, thus have a structure which is open towards the outside and are formed, in the example illustrated, by an arc of a circle of approximately 270°. The remaining axial opening of the sockets 15 has a width marked l in FIG. 2, which is slightly smaller than the diameter of the balls 3 so as to allow the insertion of the balls in the sockets 15, or the mounting of the cage 4 on the row of balls 3, by clicking the balls 3 into place in the respective sockets 15. The width of the axial opening l can be for example between 92% and 97% of the diameter of the balls 3.

The mounting is made possible by the flexibility of the projecting portions 18. To improve this flexibility, in the example illustrated, axial notches 21 are provided. The notches 21 extend from the free outer edges 17 of the portions 18 to near the plane containing the axes of the imaginary cylinders defining the sockets 15, which corresponds to approximately 20 to 60% of the axial length of the projecting portions 18. The notches separate two tabs or claws 22 each of which forms both one edge of a socket 15 and one edge of a notch 21. The tabs 22 can bend elastically in the circumferential direction when the cage 4 is clicked into place axially on the balls 3 then return to normal position to provide the relative axial retention of the cage 4 on the balls 3. The notches 21, which have a certain width, can be replaced by slits of smaller width and similar length.

Figure 4:
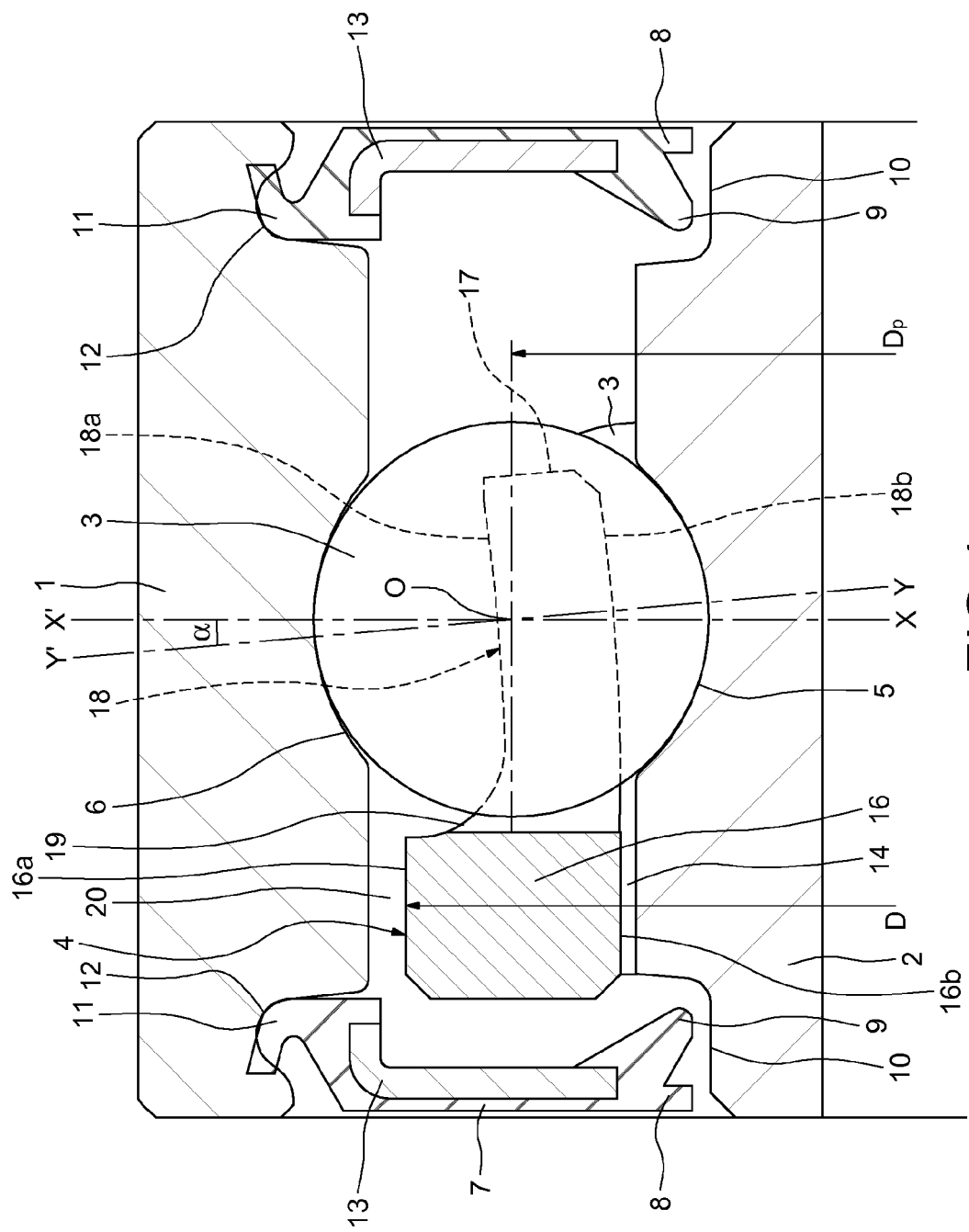
FIG. 4 is a cross-section view similar to FIG. 1, showing the bearing turning at high speed.

FIG. 4, in which identical elements bear the same reference numbers, illustrates the position taken by the projecting portions 18 during high-speed operation. The projecting portions 18 undergo a slight deformation due to centrifugal force. The axis YY' of the imaginary cylinder defining the sockets makes an angle α with the radial axis XX'. The area of contact between the equatorial plane of the balls 3 and the cylindrical sockets of the cage 4 has moved towards the centre of the sockets by moving closer to the inner surface 18b.

The transmission of forces between the balls and the cage is therefore improved.

The result of this is that the configuration of the cage according to the invention not only reduces deformations at high speed due to the small radial dimension of the projecting portions, but also ensures a satisfactory contact between the balls and the cage at high speed. The cage according to the invention can thus operate correctly at high speed but can also withstand powerful angular accelerations.

In the example illustrated, the cage 4 was made of a copper alloy such as bronze or brass. These materials have the advantage of having a low coefficient of friction on the steel of the balls. For example, bronze CuSn8P or brass CuZn40Mn1Pb, which are satisfactory in applications at high speed, high acceleration and high temperatures, could be mentioned. Thus, reduced friction is obtained between the cage and the balls, on the one hand, and between the cage and the cylindrical part of the inner race, on the other hand. A cage made of steel can also be used, for example a steel which meets the AMS 6415 specification, of which the coefficient of friction can be reduced by a metallic antifriction coating, for example a coating of silver.

Thus, according to the invention, a rolling bearing with a ball retaining cage is obtained, both light and durable, not very sensitive to deformations due to centrifugal force and able to withstand high speeds, accelerations and temperatures.

The invention claimed is:

1. A rolling bearing comprising:
an outer race;
an inner race;
at least one row of balls disposed between the outer and inner races;
a generally annular cage formed of a metallic material and configured to retain the balls, the cage having an annular shoulder, a plurality of projecting portions extending axially from the shoulder, a plurality of sockets defined between the projections, each socket being configured to receive a separate one of the balls and extending radially through the cage, the surface of each socket cooperating with one of the balls being defined by an imaginary cylinder with an axis oriented radially and cut by the plane axially delimiting the cage on the side opposite the shoulder, so as to form an axial opening of the socket, the width of the socket opening being smaller than the diameter of each ball, and wherein
the projecting portions are positioned such that a largest segment of each portion is disposed on the inside in relation to the center of the balls.

2. The bearing according to claim 1 wherein the radial thickness of the shoulder of the cage is greater than the radial thickness of the free ends of the projecting portions.

3. The bearing according to claim 1, wherein the outer diameter of the projecting portions, when the bearing is stationary, is less than the outer diameter of the shoulder and greater than the original diameter of the bearing corresponding to the diameter of the circle described by the centres of the balls when the bearing is operating.

4. The bearing according to claim 1, wherein the axial length of the projecting portions is less than the diameter of each of the balls.

5. The bearing according to claim 1, wherein the width of the axial opening of the sockets is between 92% and 97% of the diameter of each of the balls.

6. The bearing according to claim 1, wherein the projecting portions have axial slits or notches located between the sockets.

7. The bearing according to claim 6, wherein the slits or notches extend over an axial length of between 20% and 60% of the axial length of the said projecting portions.

8. The bearing according to claim 1, wherein the shoulder and the projecting portions are connected by a rounded part.

9. The bearing according to claim 1, wherein the cage is placed around the inner race of the bearing with a radial clearance between the cage and the said race of between 0.1 and 0.4 mm.

10. The bearing according to claim 1, wherein the cage is made from one of a copper alloy and steel.

11. A metallic retaining cage for the balls of a rolling bearing, the cage comprising:
an annular shoulder;
a plurality of projecting portions extending axially from the shoulder;
a plurality of sockets each configured to receive a separate ball and extending radially through the cage, the surface of each socket cooperating with one of the balls being defined by an imaginary cylinder with an axis oriented radially and cut by the plane axially delimiting the cage on the side opposite the shoulder so as to form an axial opening of the socket, the width of this opening being less than the diameter of the imaginary cylinder, and wherein
the sockets are positioned such that a largest segment of each socket is disposed on the inside in relation to a center of the balls.

12. The cage according to claim 11, wherein the radial thickness of the shoulder is greater than the radial thickness of the free ends of the said projecting portions.

13. The cage according to claim 11, wherein the axial length of the projecting portions is less than the diameter of the imaginary cylinder.

14. The cage according to claim 11, wherein the projecting portions have axial slits or notches located between the sockets.

15. The cage according to one of claim 11, wherein the shoulder and the projecting portions are connected by a rounded part.

16. The cage according to one of claim 11, wherein the cage is made from one of a copper alloy and steel.

17. A rolling bearing comprising:
an outer race;
an inner race;
at least one row of balls disposed between the outer and inner races;
a generally annular cage formed of a metallic material and configured to retain the balls, the cage having an annular shoulder, a plurality of projecting portions extending axially from the shoulder, a plurality of sockets defined between the projections, each socket being configured to receive a separate one of the balls and extending radially through the cage, the surface of each socket cooperating with one of the balls being defined by an imaginary cylinder with an axis oriented radially and cut by the plane axially delimiting the cage on the side opposite the shoulder, so as to form an axial opening of the socket, the width of the socket opening being smaller than the diameter of each ball, and wherein the outer diameter of the projecting portions, when the bearing is stationary, is less than the outer diameter of the shoulder and greater than the original diameter of the bearing corresponding to the diameter of the circle described by the centres of the balls when the bearing is operating.

18. The bearing according to claim 17 wherein the radial thickness of the shoulder of the cage is greater than the radial thickness of the free ends of the projecting portions.

19. The bearing according to claim 17, wherein the axial length of the projecting portions is less than the diameter of each of the balls.

20. The bearing according to claim 17, wherein the width of the axial opening of the sockets is between 92% and 97% of the diameter of each of the balls.

21. The bearing according to claim 17, wherein the projecting portions have axial slits or notches located between the sockets.

22. The bearing according to claim 21, wherein the slits or notches extend over an axial length of between 20% and 60% of the axial length of the said projecting portions.

23. The bearing according to claim 17, wherein the shoulder and the projecting portions are connected by a rounded part.

24. The bearing according to claim 17, wherein the cage is placed around the inner race of the bearing with a radial clearance between the cage and the said race of between 0.1 and 0.4 mm.

25. The bearing according to claim 17, wherein the cage is made from one of a copper alloy and steel.

* * * * *